United States Patent [19]

Diefenbach et al.

[11] Patent Number: 4,868,435

[45] Date of Patent: Sep. 19, 1989

[54] SINGLE PHASE SYNCHRONOUS MOTOR VIBRATION APPARATUS

[75] Inventors: Gerhard Diefenbach, Aachen, Fed. Rep. of Germany; Hugo Schemmann, Schaesberg, Netherlands; Romuald L. Bukoschek, Klagenfurt, Austria

[73] Assignee: U.S. Philips Corp., New York, N.Y.

[21] Appl. No.: 47,603

[22] Filed: May 7, 1987

Related U.S. Application Data

[63] Continuation of Ser. No. 698,056, Feb. 4, 1985, abandoned.

[30] Foreign Application Priority Data

Feb. 8, 1984 [DE] Fed. Rep. of Germany ....... 3404297

[51] Int. Cl.$^4$ ......................... H02K 5/24; F16F 15/12

[52] U.S. Cl. .................................... 310/47; 30/43.92; 74/54; 310/51; 310/80

[58] Field of Search ............................ 310/41, 80–83, 310/47, 50, 51; 30/43.92; 74/53, 54

[56] References Cited

U.S. PATENT DOCUMENTS

| | | | |
|---|---|---|---|
| 547,860 | 10/1895 | Paige | 74/54 |
| 2,509,868 | 5/1950 | Irrgany | 310/47 X |
| 3,699,281 | 10/1972 | Harris | 74/54 |
| 3,840,760 | 10/1974 | deBoer | 310/81 X |
| 3,984,710 | 10/1976 | Poel | 310/41 |
| 4,313,823 | 2/1982 | Locker | 310/51 |
| 4,400,875 | 8/1983 | Buzzi et al. | 30/43.92 |
| 4,760,297 | 7/1988 | Schemmann et al. | 310/47 |
| 4,791,327 | 12/1988 | Bertram et al. | 310/47 |

FOREIGN PATENT DOCUMENTS

| | | | |
|---|---|---|---|
| 153176 | 5/1904 | Fed. Rep. of Germany | 74/54 |
| 267291 | 11/1927 | United Kingdom | 74/54 |

*Primary Examiner*—Patrick R. Salce
*Assistant Examiner*—D. L. Rebsch
*Attorney, Agent, or Firm*—Ernestine C. Bartlett

[57] ABSTRACT

An electrically driven vibrating apparatus such as a dry shaver comprises a single-phase synchronous motor having a drive shaft, together with a part to be reciprocated. A cam is rotated by the motor drive shaft, and a lever is journalled about a pivot and is in contact with the part to be reciprocated. A pressure roller is mounted on the lever and is in constant contact with the cam profile. A compression spring acts on the lever to urge the pressure roller towards the cam.

11 Claims, 2 Drawing Sheets

SINGLE PHASE SYNCHRONOUS MOTOR VIBRATION APPARATUS

This application is a continuation, of application Ser. No. 698,056, filed Feb. 4, 1985, now abandoned.

BACKGROUND OF THE INVENTION

This invention relates to a device for a vibration apparatus, in particular a small appartus, such as a dry shaver, which is driven by a single-phase synchronous motor whose shaft carries at least one cam which cooperates resiliently with pressure means.

Such a device is known from U.S. Pat. No. 3,984,710. In this device pressure rollers, which are arranged on slides so as to be movable towards and away from one another, are urged against the cam from opposite directions. This device constitutes a starting aid and has no function in the actual drive mechanism. The spring-loaded pressure rollers ensure that after the stator has been de-energized, even in the case of high friction, the cam rotates the rotor in such a way that starting is always guaranteed or, in other words, that the principal direction of magnetization of the motor is rotated in such a way relative to the principal stator-field direction that the two directions make an angle with one another. If the two directions of magnetization coincide, the motor cannot start.

Further, it is known to drive a vibration apparatus, for example a vibration-type dry-shaver, by means of a rotary motor (see U.S. Pat. No. 4,400,875). For this purpose, two cam discs are mounted on the rotor shaft to drive the cutter of the dry shaver through a hinged lever system. This lever system is vulnerable because the individual parts are linked by integral hinges and, when it is constructed as a crank drive, it produces annoying noises.

From U.S. Pat. No. 4,400,875 it is known to use springs which in combination with the cutter form a resonant system which is tuned by means of the springs. However, these springs do not serve to rotate the rotor out of the parallel position and therefore do not constitute a starting aid in the case of high-friction loads. According to this patent it is required that in the parallel position of the rotor, the cutter is in one of the two positions of maximum excursion. In these positions the springs cannot exert torque on the rotor because the line of action of the spring force extends through the point of contact between the cam and the roller and through the rotor axis. Further, the main purpose of the springs is not to maintain contact between a cam and a roller. This contact is rather maintained by clamping two cams between two rollers.

Moreover, U.S. Pat. No. 4,400,875 also shows a drive system in which a cam drives an oscillating lever. What has been stated above about the springs also applies to this construction.

SUMMARY OF THE INVENTION

The present invention aims at providing a device of the indicated type, by means of which the rotation of a single-phase synchronous motor which rotates with a specific frequency is converted into a vibration of a vibratory part which vibrates with twice, or a higher multiple of, said frequency in such a way that a very stable and quiet operation is obtained, and by means of which starting is also possible in the case of higher frictional loads.

According to the invention this object is achieved in that a lever which is journalled about a pivot and which sets a vibratory part to be driven into vibration carries a pressure roller which follows the profile of the cam, and a compression spring acts on the lever carrying the pressure roller, to urge the pressure roller towards the cam.

In one embodiment of the invention, a pressure roller is mounted on a first lever arm of a lever which comprises at least two lever arms and which is pivotal about a pivot situated between the arms, the second lever arm, which makes an angle $\epsilon$ with the first lever arm, sets a vibratory part to be driven into vibration, and a compression spring acts on the first lever arm carrying the pressure roller to urge the pressure roller towards the cam.

The rotation is simply converted into a vibration whose frequency is multiplied by an integral multiple by means of a lever which oscillates about a central pivot and which follows the profile of the revolving cam by means of a roller arranged on the first lever arm and thereby actuates the vibratory part, which cooperates with the second lever arm.

Such a transmission device is simple to manufacture and reliable.

In a further embodiment of the invention the connecting line between the pressure-roller axis and the pivot and the central axis of the second lever arm make an angle $\epsilon$ of approximately 140° with one another, in such a way that the break point coincides with the center of the pivot, and in the center position of the lever the line of action of the compression spring extends through the shaft of the single-phase synchronous motor and perpendicularly to the connecting line between the pivotal axis and the roller axis. This construction leads to a device which is flat, narrow and not too long. The device is simple and therefore inexpensive to manufacture.

In a still further embodiment of the invention in the de-energized condition of the motor the compression spring rotates the rotor out of the position in which the rotor field and the stator field are oriented parallel to each other in the positive direction of rotation, for example, in the clockwise direction. In the case of frequency doubling the frequency with which the cutter vibrates is twice as high as the angular frequency of the motor. The cam then exhibits a 180° symmetry and the vibration amplitude depends on half the difference in length between the major axis and the minor axis of the cam. The angle $\beta$ between the axis of magnetization of the rotor and the major axis of the cam is approximately 40° to 55°, preferably 45°. This leads to quiet operation and results in substantially equal noise levels in both directions of rotation. Reliable starting of the apparatus is guaranteed.

A further advantage is that the compression spring assists in starting under high-friction conditions because the friction torque and the spring torque act in the same direction in the parallel orientation.

In a still further embodiment of the invention the line of action of the spring extends perpendicularly to the connecting line between the pressure roller axis and the pivot. During vibration the spring used in this construction is curved equally towards both sides and the load is symmetrical. In this way the spring constant is linearized and is less dependent on the spring position.

BRIEF DESCRIPTION OF THE DRAWINGS

The invention will now be described in more detail with reference to the accompanying drawings, in which.

DESCRIPTION OF THE PREFERRED EMBODIMENT

Figure 1:
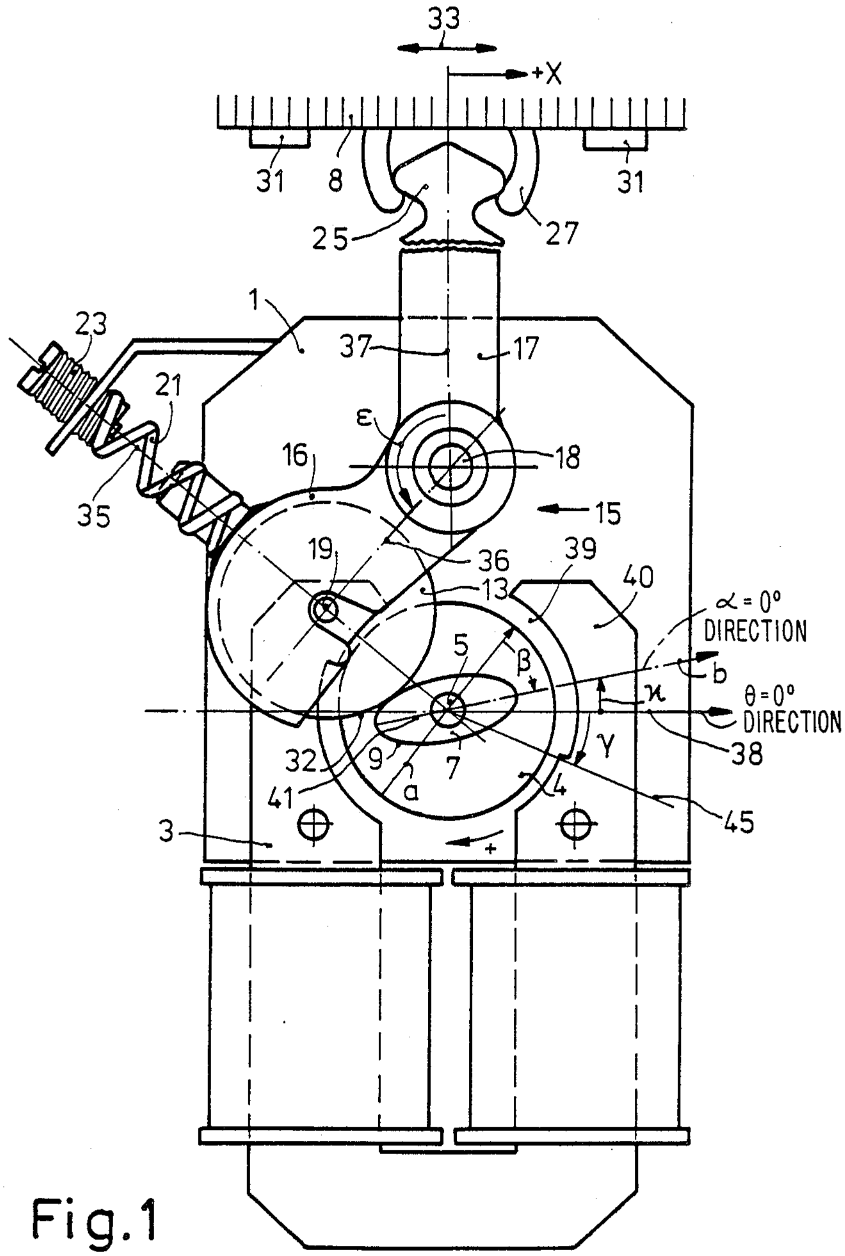
FIG. 1 shows a device including a two-arm lever.

FIG. 1 shows a double-arm lever drive for a vibration apparatus including a cam-following roller. A synchronous motor 3 with a permanent magnet rotor 4 is secured to a wall 1 of a dry shaver. The drive shaft 5 of the synchronous motor extends perpendicularly from the plane of the drawing. The drive shaft 5 carries a cam 7 which has such a profile 9 that during rotation of the cam 7 a cutter 8 of the vibration apparatus experiences a sinusoidal excursion in conformity with the angle of rotation of the cam. The major axis of the cam 7 bears the reference numeral 41.

A pressure roller 13 is urged against the cam 7 and is journalled on the roller spindle 19 in a double-arm lever 15. The double-arm lever 15 comprises two lever arms 16 and 17 which are pivotal about a common pivot 18 arranged between the two lever arms 16 and 17. By means of the spindle 19 the pressure roller 13 is mounted for rotation on the lever arm 16. The lever arms 16 and 17 are rigidly connected to each other and the central axis 37 and the connecting line 36 between the roller bearing 19 and the pivot 18 make an angle $\epsilon$ of approximately 140° with one another.

A compression spring 21, whose preload can be adjusted by means of a set-screw 23, acts on the lever arm 16. In the center position of the lever 15 the central axis 35 of the compression spring 21 extends through the motor shaft 5 and perpendicularly to the connecting line 36 between the pivot 18 and the roller axis 19.

The lever arm 17 has an end portion 25 which cooperates with portions 27 of the cutter 8. By means of guides 31 the cutter 8 is movable in the directions indicated by the double-headed arrow 33. The surface 32 of the pressure roller 13 is urged against the surface 9 of the cam 7. The pressure is such that the pressure roller 13 is never lifted off the cam 7 and does not affect the rotation of the rotor.

The rotary position of the rotor 4 is represented by the angle $\theta$. This angle should be zero if the stator field does not exert a torque on the rotor 4. In the drawing the $\theta=0°$ direction is indicated by the line 38. It depends on the arrangement of the stator in the apparatus and in the situation shown it makes an angle of approximately 90° with the central axis 37 of the lever arm 17 which drives the vibratory part if this lever arm, and consequently the vibratory part, are in the center position shown in FIG. 1.

When the stator coils are not energized the rotor 4 is subject to a magnetic reluctance torque, hereinafter referred to as a detent torque. By choosing a suitable shape for the stator pole arcs it can be achieved, in known manner, that the detent torque tends to rotate the rotor in the positive direction of rotation, for example, the clockwise direction in the drawing, out of the parallel position when $\theta=0°$ (line 38, main stator field direction) and actually rotates the rotor up to a positive angle $\theta=\Gamma$, for example, the position indicated by the line 45, where the detent torque becomes zero. The angle of asymmetry $\gamma$ depends on the shape of the pole arcs and the air gap 39 between the stator 40 and the rotor 4 and on the geometrical and magnetic rotor data and it is also influenced by the other stator specifications; this angle should be larger than approximately 5° but may also be substantially larger, up to 45°. Suitably, a value of 22° is selected. The angle $\gamma$ can be small or even zero, only if the friction to which the rotor is subject is very small or if additional mechanical, magnetic or electrical starting aids are used.

In motion converters on this type the friction torque which acts on the motor shaft 5 exhibits a minimum at the instant at which the cutter movement is reverse, for example, in the position of maximum excursion of the cutter 8, regardless of whether the excursion is positive or negative. In the drive mechanism of the cam/roller converter type the major axis 41 of the cam coincides with or is perpendicular to the line of action of the spring 35 at the instant at which the movement is reverse, if the slight oscillation of the line of action of the spring when the lever 15 is pivoted out of the central position is ignored.

However, in these positions the torque exerted on the cam 7 by the compression spring 21 is zero. For starting it is therefore necessary that in the parallel position of the rotor ($\theta=0°$) an angle $\alpha$, which is characteristic of the cam position, deviates from these zero-torque positions. This deviation can be obtained by rotating the cam 7 relative to the rotor magnet 4.

It is found to be particularly favorable if the position is such that the cutter 8 has just passed the end position and hence the position of minimum friction in which the friction is still low when the rotor reaches the parallel position as it rotates in the positive direction. In the parallel position the detent torque and the spring torque together rotate the rotor in the positive direction out of the parallel position. In order to define the angle $\beta$ between the direction of magnetization a of the rotor 4 and the major axis 41 of the cam it is assumed that the cutter position x is a sinusoidal function of twice the cam angle 2 $\alpha$, namely $$x=a\cdot\sin 2\alpha.$$

From the zero position in FIG. 1 the cutter moves to the right in the case of a positive direction of rotation of the rotor 4. The $\alpha=0°$ direction, line b, is defined in a similar way. It is shifted through 45° in the clockwise direction relative to the position in which the major axis 41 of the cam extends in the same direction as the line of action 35 of the spring. Between the $\theta=0°$ direction 38 and the $\alpha=0°$ direction b, an angle $\kappa$ (Kappa) is formed. In the present case this angle is negative. If the lines 37 and 38 are perpendicular to one another the relationship $$\kappa=135°-\epsilon$$

is valid.

To ensure a correct starting it is important that the spring auxiliary torque tends to rotate the rotor 4 in the positive direction over the entire range from $\theta=0°$ up to $\theta=\gamma$, thereby reinforcing the detent torque. For this purpose the angle $\beta$ should remain within the following limits:

$$135°+\kappa-\gamma>\beta>45°+\kappa.$$

Preferably, the angle $\beta$ should be as small as possible within these limits. If the detent torque is sufficient for starting at small friction values, then it is required that $$\beta = 45° + \kappa.$$

When $\theta = 0°$ the maximum starting torque is obtained for $$\beta = 90° + \kappa.$$

For reasons of symmetry $\beta$ should not be larger than necessary in view of the friction. A value of $\beta = 45°$ is preferred. If the asymmetry relative to the $\theta = 0°$ direction is not too large a satisfactory contribution to starting is guaranteed.

Figure 2:
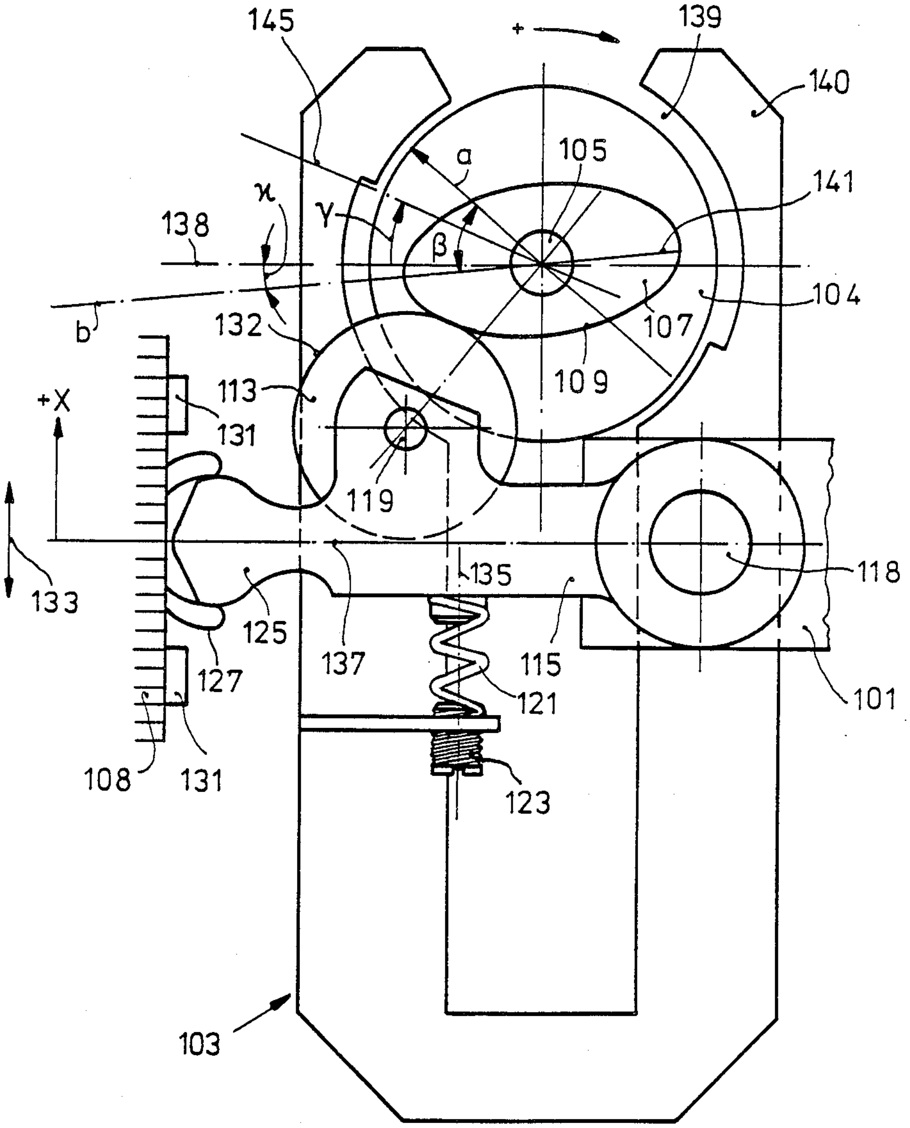
FIG. 2 shows a device including a one-arm lever.

FIG. 2 shows a single-arm lever drive for a vibration apparatus including a cam-following roller. A synchronous motor 103 with a permanent-magnet rotor 104 is secured to a member 101 of a dry shaver. The drive shaft 105 carries a cam 107 which has such a profile 109 that as the cam rotates the cutter 108 of the apparatus experiences a sinusoidal excursion which depends on the angle of rotation of the cam 107. The major axis of the cam 107 bears the reference numeral 141.

A roller 113 which is journalled on the single-arm lever 115 by means of roller bearing 119 acts on the cam 107. The single-arm lever 115 is pivotal about a pivot 118.

A compression spring 121, whose preload is adjustable by means of a set-screw 123, acts on the lever 115. The central axis 135 of the compression spring 121 extends perpendicularly to the central axis 137 of the lever 115 in the central position of this lever.

An end portion 125 of the lever 115 cooperates with portions 127 of the cutter 108. The cutter 108 is movable in the direction indicated by double-headed arrow 133 by means of guides 131. The surface 132 of the pressure roller 113 is urged against the surface 109 of the cam 107. The pressure is such that the pressure roller 113 is never lifted off the cam 107 and does not influence the rotation of the rotor 104.

The rotary position of the rotor 104 is defined by the angle $\theta$. This angle should be zero if the stator field does not exert a torque on the rotor 104. In the drawing the $\theta = 0°$ direction is given by the line 138. It depends on the arrangement of the stator 140 in the apparatus and in the present case it extends parallel to the central axis 137 of the lever 115.

When the stator coils are not energized the rotor 104 is also subject to a magnetic reluctance torque. By choosing a suitable shape for the stator pole arcs it is again possible, in known manner, to achieve that the detent torque tends to rotate the rotor in the positive direction of rotation, for example, in the clockwise direction in the drawing, out of the parallel position when $\theta = 0°$ (line 138, main stator field direction) and actually rotates the rotor up to a positive angle $\theta = \gamma$, for example, into the position indicated by the line 145 in which the detent torque becomes zero. The angle of the asymmetry $\gamma$ in this case again depends on the shape of the pole arcs and the air gap 139 between the stator 140 and the rotor 104; in the same way as in the embodiment shown in FIG. 1 it should be larger than approximately 5°, but variations in conformity with the parameters of the angle $\gamma$ in conformity with FIG. 1 are possible.

The friction torque exerted on the motor shaft 105 now also has a minimum at the instant at which the movement of the cutter is reversed, for example, in the position of maximum excursion of the cutter 108, regardless of whether the excursion is negative or positive. In the drive mechanism shown in FIG. 2 the line of action 135 of the spring extends perpendicularly to the central axis 137 of the lever if slight oscillations of the line of action of the spring when the lever 115 is pivoted out of the center position are ignored.

It is found to be very advantageous if the rotor, which rotates in the positive direction, reaches the parallel position when the cutter 108 has just passed the end position and hence the friction is minimum, when the friction is still small. The detent torque and the spring torque then together rotate the rotor out of this parallel position in a positive direction.

Owing to the rotation of the lever system relative to the zero direction 138 of the main stator field, a value which deviates from that in FIG. 1 is obtained for the angle $\beta$ between the direction of magnetization a of the rotor 104 and the major axis 141 of the cam 107.

If the direction of movement 133 of the cutter 108 and the main stator field direction 138 extend perpendicularly to one another, as shown in FIG. 2, the angle $\beta$ should be $-45°$ for the present value of the angle $\kappa$. Further, the angular relationships of FIG. 1 are valid, shifted through $-90°$.

If instead of frequency-doubling frequency multiplication by a larger integer is required, cam shapes are obtained which no longer exhibit a 180°-symmetry but whose symmetry depends on the multiplication factor. When determining the angles in particular the angle of rotation $\beta$ of the cam relative to the direction of magnetization of the rotor, a semi-axis of maximum length must be selected instead of the above-defined major axis of the cam to obtain a maximum excursion of the cutter.

What is claimed is:

1. An electrically driven vibrating apparatus such as a dry shaver, comprising a single-phase synchronous motor having a drive shaft; a part to be reciprocated; a cam rotated by the motor drive shaft; a lever journalled about a pivot and having one end in contact with the part to be reciprocated wherein the lever comprises a first lever arm and a second lever arm, said two lever arms being at one end pivoted about a common pivot, the second lever arm making an angle $\gamma$ of approximately 140° with the first lever arm; a pressure roller mounted on the lever and being in constant contact with the cam profile, the pressure roller being mounted at the other end of the first lever arm, the other end of the second lever arm being in contact with the part to be reciprocated; and a compression spring acting on the lever for constantly urging the pressure roller towards the cam, the compression spring acting on the first lever arm.

2. An electrically driven vibrating appratus such as a dry shaver comprising a single-phase synchronous motor having a drive shaft; a part to be reciprocated; a cam rotated by the motor drive shaft; a lever comprising a first lever arm and a second lever arm journalled about a pivot and having one end in contact with the part to be reciprocated, said two lever arms being at one end pivoted about a common pivot, the second lever arm making an angle $\epsilon$ with the first lever arm; a pressure roller mounted at the other end of the first lever arm and being in constant contact with the cam profile, the other end of the second lever arm being in contact with the part to be reciprocated; and a compression spring acting on the first lever arm for constantly urging the pressure roller toward the cam, wherein in the center position of the lever, the line of action of the compression spring extends through the drive shaft of motor; said angle $\epsilon$ being defined between a connecting line connecting the axis of the pressure roller and the pivot and the central axis of the second lever arm and being approximately 140° whereby the break point coincides with the center of the pivot.

3. An electrically driven vibrating apparatus such as a dry shaver comprising a single-phase synchronous motor having a rotor with an axis of magnetization and a drive shaft; a part to be reciprocated; a cam having a major axis rotated by the motor drive shaft; a lever comprising a first lever arm and a second lever arm journalled about a pivot and having one end in contact with the part to be reciprocated, said two lever arms being at one end pivoted about a common pivot, the second lever arm making an angle $\epsilon$ with the first lever arm; a pressure roller mounted at the other end of the first lever arm and being in constant contact with the cam profile, the other end of the second lever arm being in contact with the part to be reciprocated; and a compression spring acting on the first lever arm for constantly urging the pressure roller toward the cam, wherein, for a doubled frequency of the synchronous motor, an angle $\beta$ defined between the axis of magnetization of the motor rotor and the major axis of the cam is in the range of from 40° to 55°.

4. An electrically driven vibrating apparatus such as a dry shaver comprising a single-phase synchronous motor having a drive shaft; a part to be reciprocated; a cam rotated by the motor drive shaft; a lever comprising a first lever arm and a second lever arm journalled about a pivot and having one end in contact with the part to be reciprocated, said two lever arms being at one end pivoted about a common pivot, the second lever arm making an angle $\epsilon$ of approximately 140° with the first lever arm; a pressure roller mounted at the other end of the first lever arm and being in constant contact with the cam profile, the other end of the second lever arm being in contact with the part to be reciprocated; and a compression spring acting on the first lever arm for constantly urging the pressure roller toward the cam, the central axis of the second lever arm being perpendicular to the main motor stator field direction when the stator field exerts no torque on the motor rotor.

5. An electrically driven vibrating apparatus such as a dry shaver comprising a single-phase synchronous motor having a stator, a rotor and a drive shaft, an angle $\theta$ representing the rotor position and $\theta=0°$ representing the main motor stator field direction; a part to be reciprocated; a cam having a major axis rotated by the motor drive shaft, an angle $\alpha$ representing the cam position and $\alpha-0°$ representing the direction of movement of the major axis of the cam as it extends in the same direction as the line of action of a compression spring acting on the cam; a lever comprising a first lever arm and a second lever arm journalled about a pivot and having one end in contact with the part to be reciprocated, said two lever arms being at one end pivoted about a common pivot, the second lever arm making an angle $\epsilon$ with the first lever arm; a pressure roller mounted at the other end of the first lever arm and being in constant contact with the cam profile, the other end of the second lever arm being in contact with the part to be reciprocated; said compression spring acting on the first lever arm for constantly urging the pressure roller toward the cam, the angle between the $\theta=0$ direction and the $\alpha=0°$ direction being approximately $-5°$.

6. An electrically driven vibrating apparatus such as a dry shaver, comprising a single-phase synchronous motor having a rotor having an axis of magnetization and a drive shaft; a part to be reciprocated; a cam having a major axis rotated by the motor drive shaft; a lever journalled about a pivot and having one end in contact with the part to be reciprocated; a pressure roller mounted on the lever and being in constant contact with the cam profile; and a compression spring acting on the lever for constantly urging the pressure roller towards the cam, an angle $\beta$ between the axis of magnetization of the motor rotor and the major axis of the cam being approximately in the range between $-50°$ to $-35°$.

7. An electrically driven vibrating apparatus such as a dry shaver, comprising a single-phase synchronous motor having a stator, a rotor and a drive shaft, an angle $\theta$ representing the rotor position and $\theta=0°$ representing the main motor stator field direction; a part to be reciprocated; a cam having a major axis rotated by the motor drive shaft, an angle $\alpha$ representing the cam position and $\alpha=0°$ representing the direction of movement of the major axis of the cam as it extends in the same direction as the line of action of a compression spring acting on the cam; a lever journalled about a pivot and having one end in contact with the part to be reciprocated; a pressure roller mounted on the lever and being in constant contact with the cam profile; said compression spring acting on the lever for constantly urging the pressure roller towards the cam, the angle between the $\theta=0$ direction and the $\alpha=0°$ direction being approximately 50°.

8. An electrically driven vibrating apparatus such as a dry shaver, comprising a single-phase synchronous motor having a drive shaft; a part to be reciprocated; a cam rotated by the motor drive shaft; a lever journalled about a pivot and having one end in contact with the part to be reciprocated wherein the lever comprises a first lever arm and a second lever arm, said two lever arms being at one end pivoted about a common pivot, the second lever arm making an angle $\gamma$ of approximately 140° with the first lever arm; a pressure roller mounted on the lever and being in constant contact with the cam profile, the pressure roller being mounted at the other end of the first lever arm, the other end of the second lever arm being in contact with the part to be reciprocated; and a compression spring acting on the lever for constantly urging the pressure roller towards the cam, the compression spring acting on the first lever arm and on the pressure roller perpendicularly to the connecting line between the axis of said pressure roller and said pivot.

9. An electrically driven vibrating apparatus such as a dry shaver, comprising a single-phase synchronous motor having a stator, a rotor and a drive shaft, the position of the rotor being represented by the angle $\theta$ and $\theta=0°$ representing the main motor stator field direction; a part to be reciprocated moving perpendicularly to the main stator field direction; a cam rotated by the motor drive shaft; a lever journalled about a pivot and having one end in contact with the part to be reciprocated wherein the lever comprises a first lever arm and a second lever arm, said two lever arms being at one end pivoted about a common pivot, the second lever arm making an angle $\epsilon$ of approximately 140° with the first lever arm; a pressure roller mounted on the lever and being in constant contact with the cam profile, the pressure roller being mounted at the other end of the first lever arm, the other end of the second lever arm being in contact with the part to be reciprocated; and a compression spring acting on the lever for constantly urging the pressure roller towards the cam, the compression spring acting on the first lever arm.

10. An electrically driven vibrating apparatus such as a dry shaver, comprising a single-phase synchronous motor having a rotor and a drive shaft, the position of the rotor being represented by the angle $\theta$ and $\theta=0°$ representing the main motor stator field direction; a part to be reciprocated; a cam rotated by the motor drive shaft; a lever journalled about a pivot and having one end in contact with the part to be reciprocated wherein the lever comprises a first lever arm and a second lever arm, said two lever arms being at one end pivoted about a common pivot, the second lever arm making an angle $\epsilon$ of approximately 140° with the first lever arm; a pressure roller mounted on the lever and being in constant contact with the cam profile, the pressure roller being mounted at the other end of the first lever arm, the other end of the second lever arm being in contact with the part to be reciprocated; and a compression spring acting on the lever for constantly urging the pressure roller towards the cam, the compression spring acting on the first lever arm and perpendicularly to the $\theta=0°$ direction.

11. An electrically driven vibrating apparatus such as a dry shaver, comprising a single-phase synchronous motor having a rotor and a drive shaft, the position of the rotor being represented by an angle $\theta$ and $\theta=0°$ representing the main motor stator field direction; a part to be reciprocated which moves with respect to the main motor stator field direction at an angle in the range between 0° and 90°; a cam rotated by the motor drive shaft; a lever journalled about a pivot and having one end in contact with the part to be reciprocated. wherein the lever comprises a first lever arm and a second lever arm, said two lever arms being at one end pivoted about a common pivot, the second lever arm making an angle $\epsilon$ of approximately 140° with the first lever arm; a pressure roller mounted on the lever and being in constant contact with the cam profile, the pressure roller being mounted at the other end of the first lever arm, the other end of the second lever arm being in contact with the part to be reciprocated; and a compression spring acting on the lever for constantly urging the pressure roller towards the cam, the compression spring acting on the first lever arm.

* * * * *